US012447380B2

(12) United States Patent
Engle et al.

(10) Patent No.: US 12,447,380 B2
(45) Date of Patent: Oct. 21, 2025

(54) GOLF BALL HAVING MARKINGS SPACED FROM A CENTERLINE PLANE

(71) Applicant: Acushnet Company, Fairhaven, MA (US)

(72) Inventors: Courtney N. Engle, Fall River, MA (US); Michael R. Madson, Easton, MA (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 18/229,418

(22) Filed: Aug. 2, 2023

(65) Prior Publication Data

US 2023/0372783 A1 Nov. 23, 2023

Related U.S. Application Data

(62) Division of application No. 17/682,149, filed on Feb. 28, 2022, now Pat. No. 11,717,728.

(51) Int. Cl.
*A63B 45/02* (2006.01)
*A63B 37/00* (2006.01)
*B41F 17/30* (2006.01)

(52) U.S. Cl.
CPC .......... *A63B 45/02* (2013.01); *A63B 37/0022* (2013.01); *B41F 17/30* (2013.01)

(58) Field of Classification Search
CPC ........................................................ B41F 17/28
See application file for complete search history.

(56) References Cited

U.S. PATENT DOCUMENTS

| | | | | | |
|---|---|---|---|---|---|
| 676,506 | A | * | 6/1901 | Knight et al. | A63B 43/008<br>D21/708 |
| 2,202,464 | A | * | 5/1940 | Pattison | B41M 1/40<br>430/300 |
| 2,369,073 | A | * | 2/1945 | Payne | B41F 17/28<br>101/39 |
| 3,635,154 | A | * | 1/1972 | Gery | B41F 17/18<br>101/379 |
| 3,665,851 | A | * | 5/1972 | Edwards | B41M 1/40<br>101/129 |
| 3,753,565 | A | * | 8/1973 | Baker | A63B 69/3655<br>473/378 |
| 3,810,422 | A | * | 5/1974 | Kammann | B41F 15/0886<br>101/124 |

(Continued)

*Primary Examiner* — Eugene L Kim
*Assistant Examiner* — Matthew B Stanczak
(74) *Attorney, Agent, or Firm* — Steven Landolfi, Jr.

(57) ABSTRACT

A method for printing a marking on a golf ball includes arranging ink in an etching pattern on a printing plate, matching a reference position on the plate to a reference position on the golf ball, transferring the ink from the printing plate to a pad, and transferring the ink from the pad to the golf ball such that the golf ball includes the marking. The pattern includes an etch corresponding to the marking, wherein the etch differs from the marking in a manner dependent on the position of the marking on the golf ball. The marking that results on the golf ball is a linear marking, and a centerline of the linear marking lies entirely within a marking plane that is not a centerline plane of the golf ball, and wherein the edges of the marking are parallel with the marking plane.

10 Claims, 13 Drawing Sheets

(56) References Cited

U.S. PATENT DOCUMENTS

| | | | | | |
|---|---|---|---|---|---|
| 4,019,436 | A * | 4/1977 | Handweiler | B41F 17/001 | 101/163 |
| 4,023,971 | A * | 5/1977 | Vested | G03F 5/20 | 216/48 |
| 4,033,059 | A * | 7/1977 | Hutton | B42D 25/30 | 428/30 |
| 4,287,537 | A * | 9/1981 | Pfau | B41C 1/04 | 358/3.3 |
| 4,324,514 | A * | 4/1982 | Craven | B23Q 9/00 | 33/23.11 |
| 4,441,716 | A * | 4/1984 | Chen | A63B 69/3617 | 101/DIG. 40 |
| 4,469,022 | A * | 9/1984 | Meador | H10D 30/66 | 700/193 |
| 4,471,449 | A * | 9/1984 | Leavitt | G01S 7/52044 | 73/620 |
| 4,692,810 | A * | 9/1987 | Machii | G06T 3/073 | 358/400 |
| 4,782,750 | A * | 11/1988 | Marette | B41F 17/22 | 101/39 |
| 4,803,922 | A * | 2/1989 | Dennesen | A63B 45/02 | 101/406 |
| 4,889,050 | A * | 12/1989 | Meador | B41F 17/22 | 101/485 |
| 4,980,221 | A * | 12/1990 | Kobayashi | B41F 19/06 | 428/207 |
| 5,253,175 | A * | 10/1993 | Machii | B41F 17/28 | 428/577 |
| 5,282,306 | A * | 2/1994 | Katsuhiro | G06T 11/206 | 283/117 |
| 5,295,434 | A * | 3/1994 | Machii | G03F 5/00 | 101/483 |
| 5,564,707 | A * | 10/1996 | Dinh | A63B 45/02 | 473/270 |
| 5,632,205 | A * | 5/1997 | Gordon | B41M 3/00 | 101/483 |
| 5,637,265 | A * | 6/1997 | Misciagno | B29D 11/00038 | 264/2.6 |
| 5,711,217 | A * | 1/1998 | Boring | B41F 15/0895 | 101/39 |
| 5,778,793 | A * | 7/1998 | Mello | A63B 37/0003 | 473/200 |
| 5,832,819 | A * | 11/1998 | Widman | B41M 5/0256 | 101/34 |
| 5,878,670 | A * | 3/1999 | Yamaguchi | A63B 37/0022 | 101/DIG. 40 |
| 5,910,390 | A * | 6/1999 | Hatanaka | H05K 3/0082 | 430/311 |
| D414,229 | S * | 9/1999 | Sohn | D21/709 | |
| 5,950,534 | A * | 9/1999 | Philipp | B41F 17/001 | 101/163 |
| 6,158,345 | A * | 12/2000 | Gelbart | B41N 6/00 | 430/300 |
| 6,176,185 | B1 * | 1/2001 | Charlier | B41F 17/001 | 101/493 |
| D438,270 | S * | 2/2001 | MacCourt | D21/709 | |
| 6,189,451 | B1 * | 2/2001 | Pichler | B41K 1/006 | 101/35 |
| 6,209,605 | B1 * | 4/2001 | Lee | B65C 9/24 | 118/667 |
| 6,231,459 | B1 * | 5/2001 | Pettigrew | A63B 69/3688 | 473/266 |
| D471,608 | S * | 3/2003 | Hettinger | D21/708 | |
| 6,677,065 | B2 * | 1/2004 | Blauer | B60R 13/005 | 428/31 |
| D487,911 | S * | 3/2004 | Cheney | D21/713 | |
| 6,701,844 | B1 * | 3/2004 | Roy | B41M 1/14 | 101/DIG. 40 |
| 6,742,449 | B2 * | 6/2004 | Sosin | A63B 37/0003 | 73/65.02 |
| D501,900 | S * | 2/2005 | Gammon, Jr. | D21/708 | |
| 6,923,115 | B1 * | 8/2005 | Litscher | B41J 3/40731 | 101/DIG. 40 |
| 7,069,851 | B2 * | 7/2006 | Shigeta | H04N 1/405 | 101/216 |
| 7,283,657 | B1 * | 10/2007 | Carlson | A63B 47/008 | 382/141 |
| 7,393,485 | B2 * | 7/2008 | Yourist | G06T 15/00 | 700/98 |
| 7,561,301 | B2 * | 7/2009 | Osumi | B41J 3/4073 | 358/1.9 |
| 7,644,657 | B1 * | 1/2010 | Clark | B41J 3/407 | 101/35 |
| 7,691,005 | B2 * | 4/2010 | Mitsuba | A63B 37/0022 | D21/708 |
| 7,963,869 | B2 * | 6/2011 | Boyer | G01J 3/46 | 473/604 |
| 8,075,431 | B2 * | 12/2011 | Smith | A63B 43/008 | 473/607 |
| 8,358,446 | B2 * | 1/2013 | Tanaka | G03G 15/0131 | 358/463 |
| 8,403,768 | B2 * | 3/2013 | Aittola | A63B 69/3688 | 473/200 |
| 8,721,468 | B1 * | 5/2014 | Barrett | A63B 69/3688 | 473/200 |
| 9,283,443 | B1 * | 3/2016 | Hanna | B41F 15/0872 | |
| 9,688,078 | B1 * | 6/2017 | Irizarry | A63B 45/02 | |
| 10,022,954 | B1 * | 7/2018 | Melanson | A63B 37/0022 | |
| 10,350,460 | B2 * | 7/2019 | Berggren | B33Y 10/00 | |
| 10,611,181 | B1 * | 4/2020 | Moylan | B41F 23/005 | |
| 11,013,961 | B2 * | 5/2021 | Fox | A63B 37/0022 | |
| D921,135 | S * | 6/2021 | Bartels | D21/708 | |
| D921,136 | S * | 6/2021 | Bartels | D21/708 | |
| D921,779 | S * | 6/2021 | Bartels | D21/708 | |
| D921,780 | S * | 6/2021 | Bartels | D21/708 | |
| D921,782 | S * | 6/2021 | Bartels | D21/708 | |
| 11,090,529 | B2 * | 8/2021 | Barrett | A63B 43/008 | |
| D944,347 | S * | 2/2022 | Hocknell | D21/708 | |
| D968,538 | S * | 11/2022 | Barrett | D21/708 | |
| 11,717,728 | B1 * | 8/2023 | Engle | B41N 1/00 | 473/378 |
| D1,009,190 | S * | 12/2023 | Veitch | D21/708 | |
| 2001/0003716 | A1 * | 6/2001 | Kametani | A63B 45/02 | 101/35 |
| 2001/0031597 | A1 * | 10/2001 | Locatelli | B29C 51/16 | 442/293 |
| 2002/0097280 | A1 * | 7/2002 | Loper | B41J 3/40731 | 347/2 |
| 2002/0100378 | A1 * | 8/2002 | Dupuis | B41M 1/40 | 101/135 |
| 2002/0134258 | A1 * | 9/2002 | Lutz | B41F 17/001 | 101/35 |
| 2003/0086603 | A1 * | 5/2003 | Davidson | G06T 3/40 | 382/154 |
| 2003/0106442 | A1 * | 6/2003 | Gosetti | A63B 37/0022 | 101/35 |
| 2003/0121427 | A1 * | 7/2003 | Lampinski | B41M 1/40 | 101/35 |
| 2003/0136281 | A1 * | 7/2003 | Clark | B41F 17/001 | 101/41 |
| 2004/0089184 | A1 * | 5/2004 | Lampinski | A63B 45/02 | 101/483 |
| 2004/0142765 | A1 * | 7/2004 | Kennedy, III | B41M 5/0256 | 473/378 |
| 2005/0132909 | A1 * | 6/2005 | Lutz | B41F 17/30 | 101/424.1 |
| 2006/0222231 | A1 * | 10/2006 | Harris | G06T 7/0006 | 382/141 |
| 2007/0062385 | A1 * | 3/2007 | Kettinger | B41F 17/36 | 101/41 |
| 2007/0144364 | A1 * | 6/2007 | Hitchcock | B41M 5/03 | 101/41 |
| 2007/0144365 | A1 * | 6/2007 | Pulvino | B41M 3/14 | 101/41 |
| 2007/0149319 | A1 * | 6/2007 | Ohira | B44C 5/00 | 473/378 |

(56) References Cited

U.S. PATENT DOCUMENTS

2007/0157833 A1* 7/2007 Kucaba ................... B41F 31/18 101/335
2009/0059204 A1* 3/2009 Harris ....................... G01J 3/46 356/73
2009/0060315 A1* 3/2009 Harris ................... G06T 7/0004 382/141
2009/0208882 A1* 8/2009 Schmid ................... B29C 43/12 430/324
2009/0211476 A1* 8/2009 Inoue ....................... B41M 1/40 101/401
2009/0255422 A1* 10/2009 Isler ....................... A01K 43/10 101/41
2009/0255423 A1* 10/2009 Valls ...................... B41J 3/4073 101/110
2009/0282999 A1* 11/2009 Luetke .................. B41F 17/006 101/248
2010/0064912 A1* 3/2010 Martinez, Jr. .............. B41J 2/01 101/38.1
2011/0173762 A1* 7/2011 Tutmark ............ A63B 37/0022 8/445
2012/0180677 A1* 7/2012 Peterson ............... B41F 17/001 101/350.6
2013/0047871 A1* 2/2013 Poeling ................... B65C 3/163 101/483
2013/0056482 A1* 3/2013 Senn .................... B65D 1/0223 358/1.9
2013/0123046 A1* 5/2013 Gasper ............... A63B 37/0003 473/378
2013/0288024 A1* 10/2013 Clauter ..................... B44F 1/14 428/207
2014/0234500 A1* 8/2014 Mitchell ............... B41F 17/001 426/302
2014/0300676 A1* 10/2014 Miller ..................... B41F 17/38 347/110
2015/0085006 A1* 3/2015 Nick ....................... B41F 17/28 347/12
2015/0085046 A1* 3/2015 Moehringer ............... B41J 2/14 347/104
2015/0099100 A1* 4/2015 Hunt ........................ B05D 5/08 427/256
2015/0158288 A1* 6/2015 Gemelli .................. B41F 17/30 101/333
2015/0367184 A1* 12/2015 Hebert ................... A63B 45/02 101/38.1
2016/0009115 A1* 1/2016 Yamazaki ................ B41N 1/16 700/206
2018/0201011 A1* 7/2018 Efner .................... B41F 17/006
2019/0134973 A1* 5/2019 Muraoka ................ B41N 10/02
2019/0337304 A1* 11/2019 Allen ........................ B32B 7/12
2020/0129819 A1* 4/2020 Hazellief ............... A63B 45/02
2020/0215815 A1* 7/2020 Muraoka .................. B41M 5/03
2020/0215834 A1* 7/2020 Bauer .................... B41J 25/006
2020/0223232 A1* 7/2020 Lee ......................... B41F 17/22
2020/0292977 A1* 9/2020 Sato ..................... G03G 15/234
2020/0316935 A1* 10/2020 Bullington ........... B41J 2/04508
2021/0023835 A1* 1/2021 Choi ..................... B41F 17/006
2021/0055709 A1* 2/2021 Rao ........................ B41J 11/002
2021/0080936 A1* 3/2021 Zahner, III ......... G05B 19/4099
2021/0136255 A1* 5/2021 Morisse ................. H04N 1/405
2021/0334701 A1* 10/2021 Chang .................. G06V 10/764
2021/0354448 A1* 11/2021 Xie ...................... B41J 2/04586
2021/0360121 A1* 11/2021 Lee ...................... H04N 1/3877
2021/0397914 A1* 12/2021 Hikichi ................ G06K 15/408
2022/0032651 A1* 2/2022 Hasegawa ............ B41J 2/04541
2022/0161101 A1* 5/2022 Madson ............. A63B 37/0076
2022/0161102 A1* 5/2022 Hogge ................. A63B 43/008
2022/0171320 A1* 6/2022 Kuo ................... G03G 15/5029
2023/0051478 A1* 2/2023 Hashimura ........... B41F 13/187
2024/0017540 A1* 1/2024 Muraoka ............. B41F 16/0086

* cited by examiner

GOLF BALL HAVING MARKINGS SPACED FROM A CENTERLINE PLANE

CROSS-REFERENCE TO RELATED APPLICATIONS

This application is a divisional of U.S. patent application Ser. No. 17/682,149, filed Feb. 28, 2022, which is hereby incorporated herein in its entirety.

FIELD OF THE INVENTION

The present disclosure relates generally to a golf ball having markings, and, more particularly, to pad printing linear markings on the golf ball that are spaced from a centerline plane of the golf ball.

BACKGROUND OF THE INVENTION

Considering a top-down view on a sphere, it is a relatively straightforward task to print a line on a golf ball that passes through the center of the ball at its highest point and appears to be a perfectly straight line as that curve wraps around the surface of the ball. That curve is essentially the result of wrapping a planar line around the sphere coincident with its great circle, and this technique is the basis of most alignment aids and devices that allow such a curve to be drawn on the golf ball's surface.

What is significantly less obvious, however, is how to print a curve that runs exactly parallel to that centerline curve but lies off-center on the ball. Wrapping a planar line displaced from the centerline around the ball's surface ultimately generates an arc that curves inward towards that centerline when viewed from above due to the curvature of the sphere. In other words, the points along that planar line are not equidistant from the centerline of the ball once wrapped over its surface. To print a curve that runs truly parallel to (i.e. equidistant from) the centerline requires counteracting the curvature of the surface by wrapping a planar curve—rather than a planar line—around the ball.

The disclosed embodiments include methods that address these and other issues in order to print curves on the golf ball's surface that appear exactly linear regardless (i.e. have no apparent curvature) of their position relative to the centerline.

SUMMARY OF THE INVENTION

In some embodiments, the present disclosure describes a method for printing a marking on a golf ball. The method includes arranging ink in an etching pattern on a printing plate. The pattern includes an etch corresponding to the marking. The etch differs from the marking in a manner dependent on the position of the marking on the golf ball. The method also includes matching a reference position on the plate to a reference position on the golf ball, transferring the ink from the printing plate to a pad, and transferring the ink from the pad to the golf ball such that the golf ball includes the marking, wherein the marking is a linear marking. In a plan view as viewed in a direction toward the reference position of the golf ball, a centerline of the linear marking lies entirely within a marking plane that is not a centerline plane of the golf ball. In addition, the edges of the marking are parallel with the marking plane.

In some embodiments, the present disclosure describes a computer-implemented method for preparing a printing system for printing on a golf ball. The method includes receiving, at a design system comprising a processing unit, an intended design for a golf ball marking, the intended design including a shape of the marking and a position of the marking on the golf ball. The method also includes generating, by the processing unit, an adjusted design based on the shape and position of the marking of the intended design and designing an etching pattern based on the adjusted design. The method further includes providing the etching pattern to a production system configured to produce a printing plate having the etching pattern. The printing plate is configured to produce, by a pad printing process, a golf ball having a marking matching the intended design when viewed from a standard golfing position.

In other embodiments, the present disclosure also describes a golf ball printing system. The golf ball printing system includes design system configured to receive an intended design for a golf ball marking and determine an adjusted design for the golf ball marking, a production system configured to produce a printing plate having an etching pattern based on the adjusted design, and an action system configured to print a marking on a golf ball using the printing plate and the etching pattern, the marking matching the intended design when viewed from a standard golfing position.

In some other embodiments, the present disclosure describes a golf ball. The golf ball includes a reference position that lies in a centerline plane in a plan view as viewed in a direction toward the reference position of the golf ball. The golf ball also includes a pad-printed linear marking comprising a pad-printing ink and linear edges defined by a constant thickness. In the plan view, a centerline of the linear marking lies entirely within a marking plane that is not the centerline plane of the golf ball. In addition the edges of the marking are parallel with the marking plane.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF THE INVENTION

Golf balls often include printed indicia at various locations on the surface. There are several printing methods for applying the indicia, including pad printing and laser jet printing, for example. In pad printing, ink is deposited onto a plate and arranged in a pattern corresponding to the markings to be made on the golf ball. A pad contacts the plate and thereby receives the ink on the pad surface. The ink is then transferred from the pad to the golf ball by "stamping" (i.e., pressing) the inked pad onto the golf ball. Pad printing is an indirect intaglio process. Depressions are created in a flat block called "the plate" or pad printing cliche. The depressions are filled with ink and a smooth, resilient stamp block of silicone rubber takes up ink from the plate and transfers it to the golf ball.

The pad printing process begins by spreading ink across the surface of a plate using a spatula. The ink is then scraped back into the ink reservoir using a doctor blade, which leaves ink in the depressions on the plate. Thinner evaporates from the ink lying in these depressions and the ink surface becomes tacky. As the pad passes over the depressions, ink will stick to the pad. As the pad lifts, it takes with it not only the tacky, adhering film, but also some of the more fluid ink underneath. This film of ink is carried to the target area on the dimpled golf ball surface. On the way, more of the thinner evaporates from the exposed surface of the ink on the silicone pad, and the ink surface facing away from the pad becomes tacky. As the pad is applied to the golf ball, the film of ink sticks to the ball surface and separates from the pad as it is raised.

Figure 1:
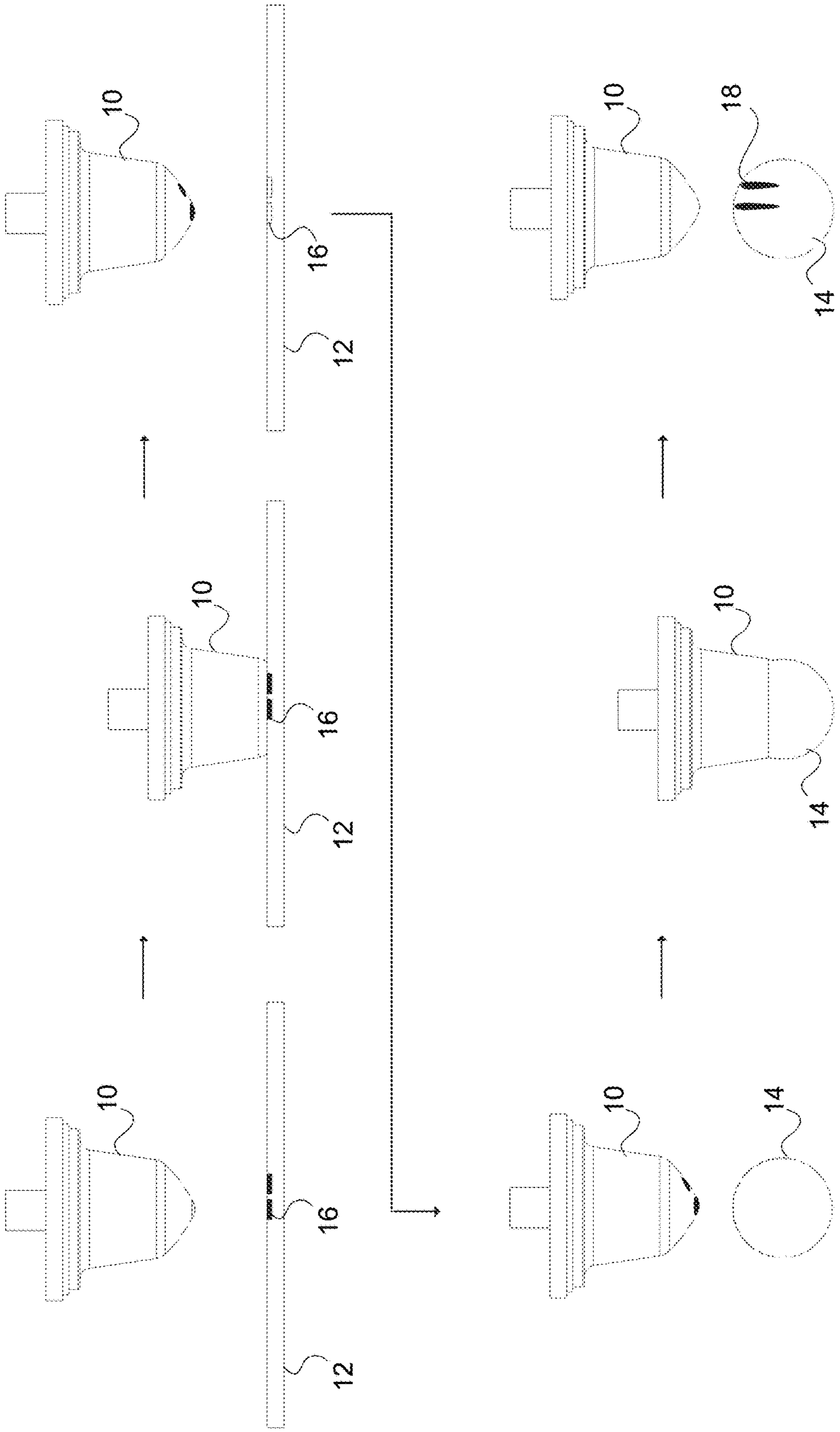
FIG. 1 is a diagram of a pad printing process, consistent with disclosed embodiments.

FIG. 1 is a diagram of an exemplary pad printing process. The pad printing process includes a pad 10, a printing plate 12, and a golf ball 14. The pad printing process generally includes an etching pattern 16 formed in the printing plate 12. The etching pattern 16 may correspond to a marking 18 to be ultimately printed on the golf ball 14. The etching pattern 16 may include depressions or wells formed in a surface of the printing plate 12, and a selected ink may fill the wells. In a first shown step, the pad 10 may be arranged above the etching pattern 16 on the printing plate 12. The process continues with the pad 10 contacting the printing plate 12 such that the ink arranged in the etching pattern 16 is transferred to the surface of the pad 10 when the pad 10 is removed from the printing plate 12. The golf ball 14 is then positioned beneath the pad 10. The golf ball 14 may be aligned such that the ink on the pad 10 is directly above the portion of the surface of the ball to be stamped. The pad 10 is then moved into contact with the golf ball 14 to transfer the ink from the pad 10 to the surface of the golf ball 14. The resulting stamped golf ball 14 includes a marking 18 that corresponds to the etching pattern 16 on the printing plate 12.

While pad printing on a flat surface is a fairly straightforward process, printing on a spherical object such as a golf ball has some challenges. For example, the further the stamp is from a centerline plane, the more distorted the pattern becomes when the ink is transferred to the ball due to the curvature of the golf ball. The distorted pattern, as printed on the golf ball, may be particularly noticeable when viewed from a standard golfing position, which herein is defined as a golfer standing over and looking down at a golf ball. Due to these distortions, markings that are intended to appear linear, such as alignment aids, may appear to the observer as arcs or curves, and this effect is especially noticeable on markings that are not coincident with the centerline plane.

Figure 2A:
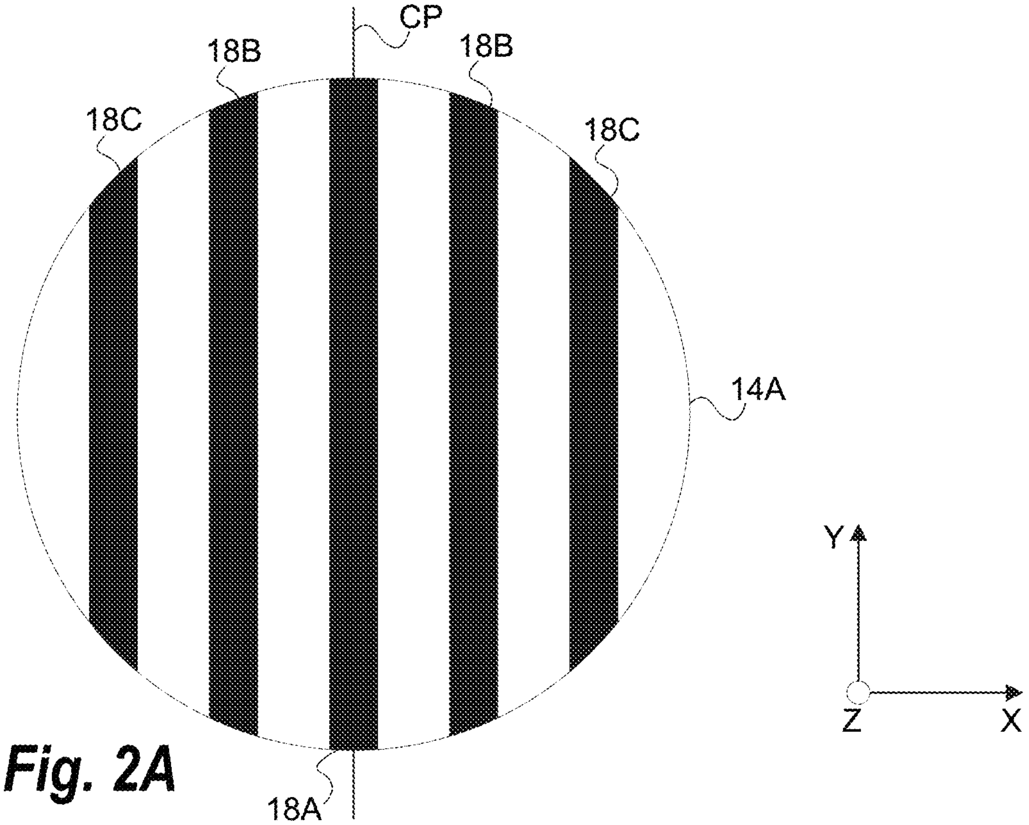
FIG. 2A is a golf ball having a final appearance reflective of the intended design appearance with no apparent curvature of any line.
Figure 2B:
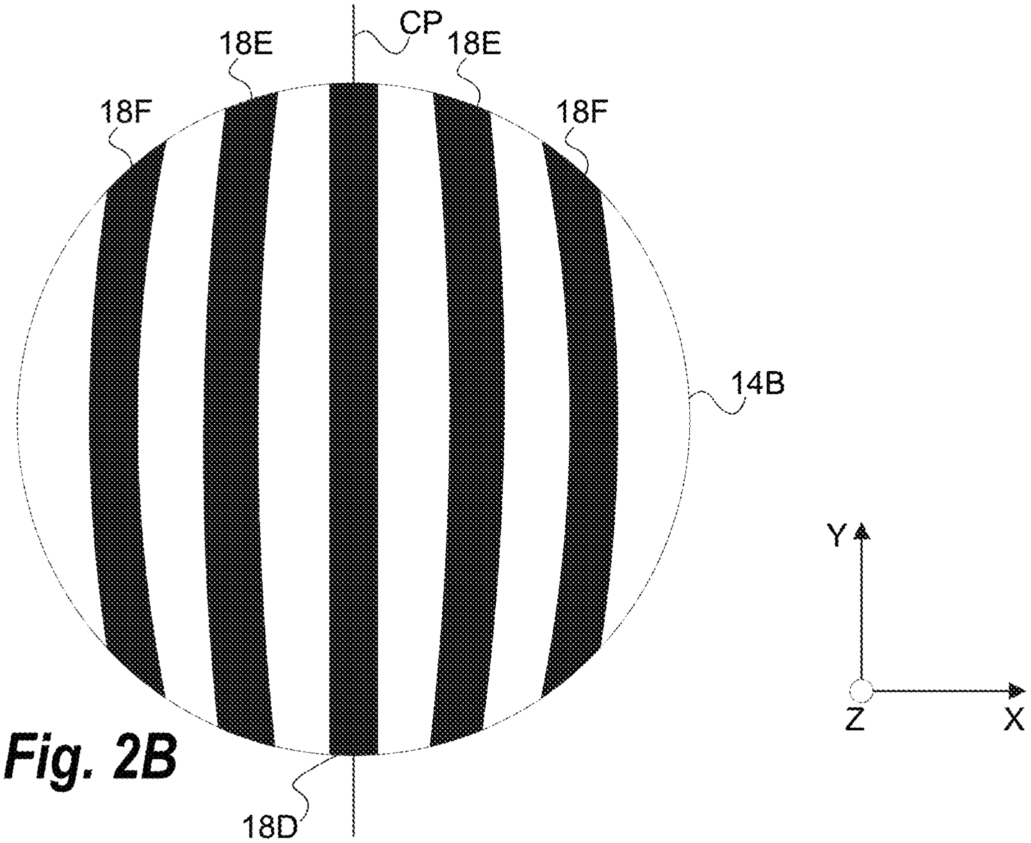
FIG. 2B is a golf ball having a final appearance due to the distortion of the intended design by the curvature of the golf ball.

FIG. 2A depicts an example golf ball 14A having markings 18A, 18B, and 18C and FIG. 2B depicts an example golf ball 14B having markings 18D, 18E, and 18F. The golf balls 14A, 14B are depicted in a two-dimensional top view that approximates a view of the surface of the golf ball that is seen by an observer (e.g., a golfer) standing over the golf ball (e.g., to align the golf ball with a target or to strike the golf ball with a golf club). In an exemplary embodiment, the X-direction as shown is a proximal-distal direction that extends away from a centerline plane CP. The Y-direction as shown is a side-to-side lateral direction that may be parallel to a target line for a golfer-observer. The Z-direction is directed into and out of the page of the drawing and represents the direction from which the observer views the ball. The centerline plane CP passes through a center of the golf ball in the Y-Z plane. As is common practice in golf, a golfer may position the golf ball (e.g., on a putting green or on a tee) such that the centerline plane CP is parallel to or coincident with a target line (i.e., the intended initial path of the golf ball when struck). The markings 18A, 18B, and/or 18C may be intended to assist the golfer with aligning and/or hitting the golf ball 14A down the target line.

The golf ball 14A includes an "intended design" that is made up by the markings 18A, 18B, and 18C. As used herein, the "intended design" is an intended (e.g., by a designer, manufacturer customer, etc.) visual appearance for markings on a golf ball when viewed from a particular direction. For example, the intended design in FIG. 2A includes markings 18A, 18B, and 18C that appear as parallel lines to an observer viewing the golf ball 14A from the Z-direction. This visual appearance of one or more linear markings parallel to a centerline plane CP may assist the golfer with aligning and/or hitting the golf ball 14A down a target line. However, as discussed herein, the intended design may be distorted when applied to a golf ball through printing, especially pad printing, if the curvature of the surface is not appropriately considered.

FIG. 2B depicts a "resulting marking" that may result when attempting to print the intended design of FIG. 2A. As used herein, a "resulting marking" is the actual visual appearance of markings printed on a golf ball when viewed from a particular direction. For example, the resulting marking in FIG. 2B includes markings 18D, 18E, and 18F in the form of line markings having a degree of distortion that depends on the position and geometry of the marking on the golf ball. More particularly, the farther the marking is from a centerline plane CP in the X-direction (+ or −), the greater the resultant distortion, with the greatest distortion occurring at the visual boundary of the golf ball. In a top view, the visual boundary generally corresponds to the two-dimensional circle having a radius equal to the radius of the golf ball. As shown in FIG. 2B, the marking 18D is slightly distorted, if at all, in comparison to the marking 18A, which is on the centerline plane CP. In contrast, the markings 18E are distorted in comparison to the markings 18B, and the markings 18F are even more distorted in comparison to the corresponding markings 18C of the intended design. Disclosed embodiments include systems and methods for producing an intended design using printing on a golf ball while mitigating distortions.

According to disclosed embodiments, to counteract the curvature of the golf ball and create visually straight and off-center lines and stamps (e.g., alignment markings, logos, side stamps, etc.) on the surface of the finished ball, the intended design is adjusted to create a corresponding etching pattern on a printing. The adjustment to the corresponding etching pattern depends on different factors, including the position of the intended design on the golf ball. In particular, the adjustment depends on measured variables that identify the position of an intended design on the golf ball. The present disclosure includes an exemplary process for determining measured variables, such as an offset angle ω, a marking thickness Δx, a wrap angle φ, and the radius of the ball $r_{ball}$.

Figure 3A:
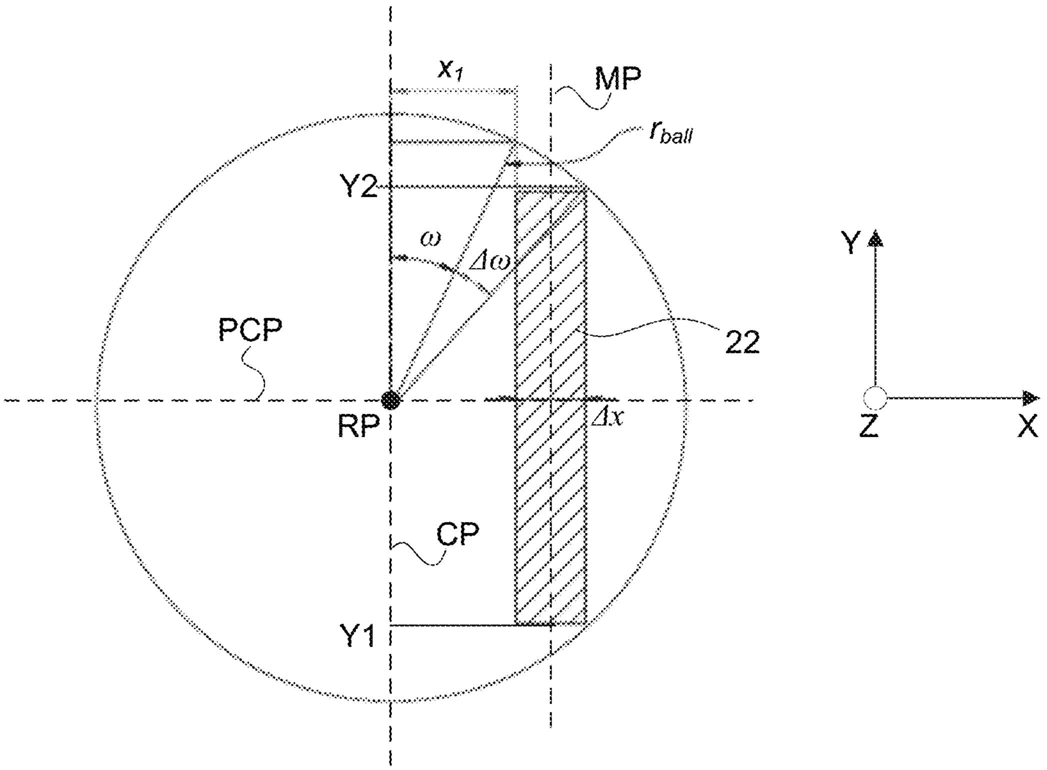
FIG. 3A is a top view of a golf ball having an intended design that includes a marking that is positioned off of a centerline plane of the golf ball and that has no apparent curvature.
Figure 3B:
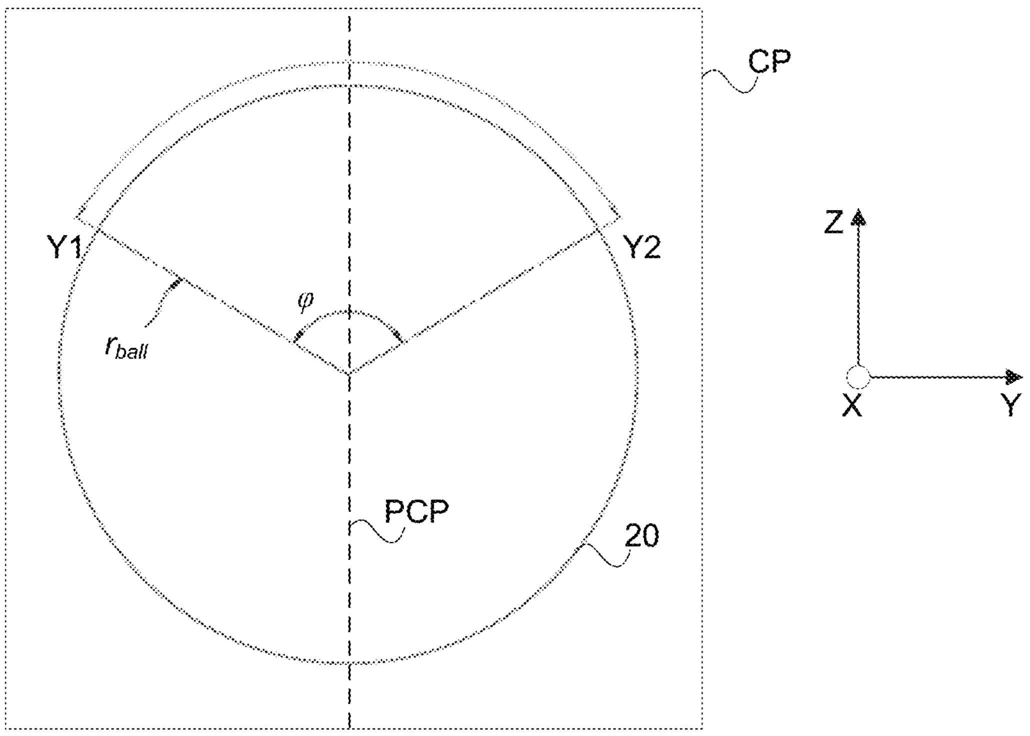
FIG. 3B is a cross-sectional view of the golf ball of FIG. 3A, taken at a centerline plane.

FIGS. 3A and 3B depict a golf ball 20 having a marking 22. FIG. 3A depicts an exemplary coordinate system for identifying positions on the golf ball 20. FIG. 3A is a direct top view, which corresponds to a view from a standard golfing position, which is above the ball in the Z-direction, and may also be referred to herein as a plan view of a golf ball. A plan view of a golf ball is a view looking at the ball in the Z-direction and the corresponding two-dimensional circle that is observed, such as the golf ball 20 shown in FIG. 3A.

FIG. 3B is a cross-sectional view of the golf ball taken at the centerline plane CP and viewed from an X-direction, parallel to the Y-Z plane of FIG. 3A. The golf ball 20 defines a centerline plane CP that entirely passes through a center of the ball and falls within the Y-Z plane X=0 position. In other words, the centerline plane CP bisects the golf ball 20 and includes a normal that is collinear with the X-axis. The golf ball 20 also defines a perpendicular centerline plane PCP that is perpendicular to the centerline plane CP, also bisects the golf ball 20, and whose normal is collinear with the Y-axis. The golf ball 20 further defines a reference point RP, which is located approximately at the center of the golf ball when viewed from the standard golfing position (i.e., FIG. 3A). As shown in FIG. 3A, the reference point RP is located at the X=0, Y=0 position of the coordinate system, which is a point of intersection between the centerline plane CP and the perpendicular centerline plane PCP.

A linear marking is considered to lie entirely within a plane when the centerline of the marking may be determined to lie entirely within the plane. The marking 22, as shown in the plan view of FIG. 3A (viewed in a direction toward the reference position RP), lies entirely within a marking plane MP that is not the centerline plane CP of the golf ball. The marking 22 (or any other linear marking) inherently has some thickness that extends beyond the boundaries of an infinitesimal thickness of a plane, and edges of the marking may be separately analyzed for parallelism to the plane. In other words, in order to be considered as lying "entirely" within the marking plane MP, a centerline of the linear marking (not considering a thickness of the marking) must lie entirely within the marking plane MP and the edges of the marking must be parallel to that centerline of the marking. The marking 22 may also be described as being coincident with a perimeter of a base of a spherical cap, with a base of the spherical cap lying entirely within the marking plane MP. The marking plane MP is parallel to the centerline plane CP. With the marking 22 being spaced from the centerline plane CP, the corresponding spherical cap on which the marking 22 would lie has a volume that is less than half of that of the golf ball.

The marking 22 may represent an intended design—an intended appearance of a printed marking. In an exemplary embodiment, the marking 22 may be a linear marking and be parallel to the centerline plane CP as shown. Used here, parallel indicates that every co-radial point on a marking or plane is equidistant from the centerline plane CP when viewed from the standard golfing position (in the case of FIG. 3A, this is from the Z-direction), allowing for a parallelism tolerance of 1.5% or less. The parallelism tolerance is defined as $$\text{parallism tolerance} = 2\frac{d_{max} - d_{min}}{d_{max} + d_{min}} \times 100$$

wherein $d_{max}$ is the maximum absolute distance between the marking in the marking plane MP and the centerline plane CP and $d_{min}$ is the minimum absolute distance between the marking in the marking plane MP and the centerline plane CP.

Used here, perpendicular indicates that every co-radial point on a marking is equidistant from the perpendicular centerline plane PCP when viewed from the standard golfing position (in the case of FIG. 3A, this is from the Z-direction), allowing for a parallelism tolerance of 1.5%. The parallelism tolerance indicates that the distance between the co-radial points may vary and still be considered parallel but not by more than the parallelism tolerance. A parallelism tolerance of 0.5% may also be applied to determining whether the edges of the marking 22 are parallel to the marking plane MP.

The position of the marking 22 on the golf ball 20 can be determined geometrically based on a displacement $x_1$, an offset angle ω, a line thickness Δx, a wrap angle φ, and the radius of the ball $r_{ball}$, as shown in FIGS. 3A-3B. A more proximal side of the marking 22, herein referred to as the inner edge, will have a horizontal planar displacement from the centerline plane CP of $x_1$ as shown in FIG. 3A. The distal side of the marking 22, herein referred to as the outer edge, will have a horizontal planar displacement from the center line of $x_1+\Delta x$. As used herein, "horizontal" refers to a direction perpendicular to a target line direction and parallel to the viewing plane. For example, the X-direction is a horizontal direction as depicted and described herein.

The offset angle ω may include a second offset angle Δω, which also identifies the location of the distal side of the marking 22. The offset angles ω, Δω can be determined geometrically using the centerline plane CP, the displacements $x_1$ and Δx, and the radius of the ball $r_{ball}$. The wrap angle φ can be measured and/or calculated and indicates the extent to which the marking 22 extends along the golf ball 20 in the Y-direction (e.g., from points Y1 to Y2 on the Y-axis), as shown in FIGS. 3A and 3B.

Figure 3C:
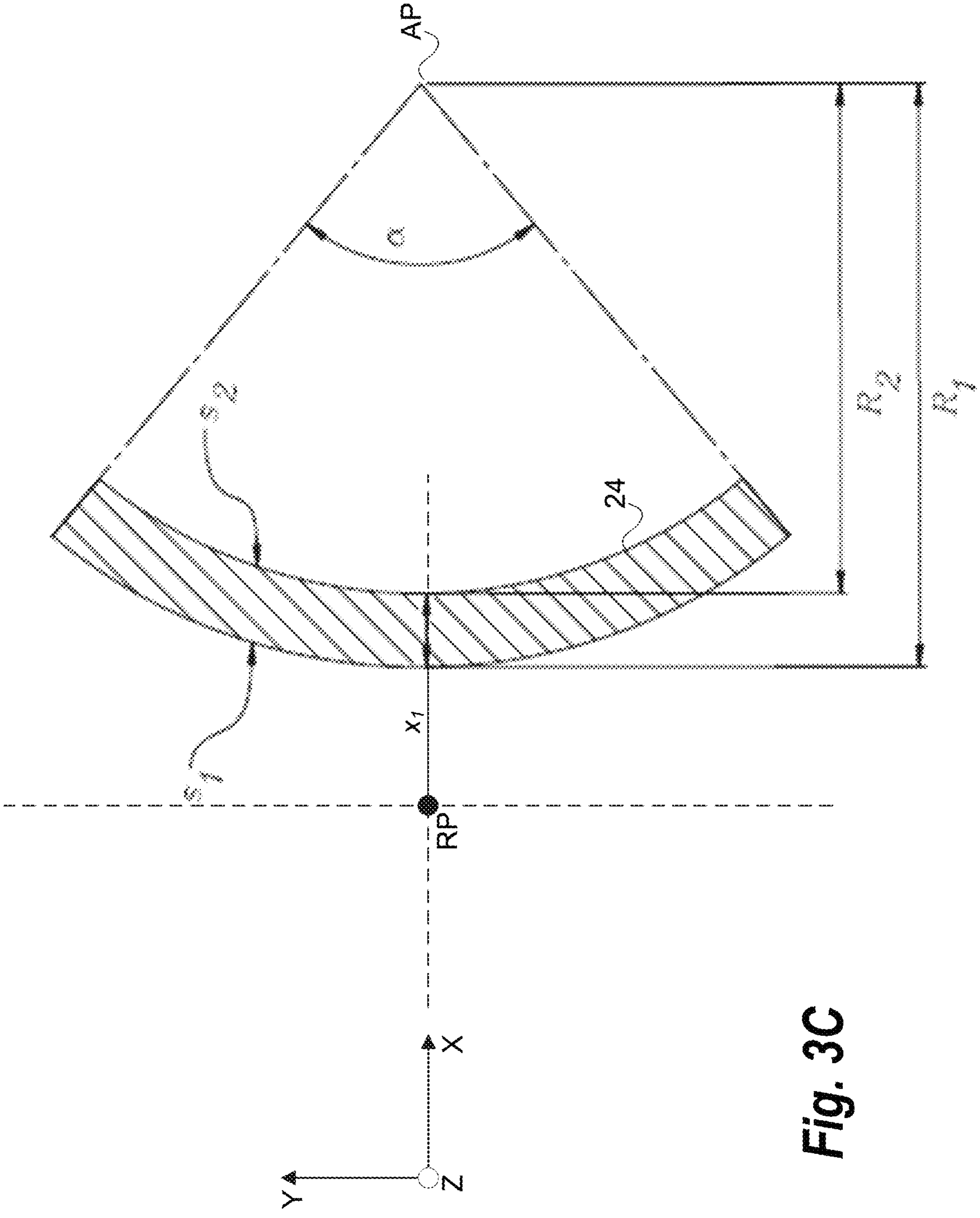
FIG. 3C is a depiction of an adjusted planar design that is generated based on the position and geometry of the intended design of FIGS. 3A-3B.

FIG. 3C is an example of an adjusted design 24 that compensates for the position of the marking 22 on the golf ball 20. The adjusted design 24 is defined by "adjusted variables," such as arcs $s_1$ and arc $s_2$, which are correspond to the proximal and distal edges of the marking 22, respectively. The arcs $s_1$ and $s_2$ depend on the variables that define the marking 22 and include an arc angle α that is shared by the arcs $s_1$ and $s_2$. Additional adjusted variables may include adjusted displacements $R_1$ and $R_2$, which are the radii of the arcs $s_1$ and $s_2$. Another adjusted variable, herein referred to as arc position AP, may be a center from which the arcs $s_1$ and $s_2$ are measured. The arc position AP may be determined based on the reference position RP, the displacement $x_1$, and the adjusted displacement $R_1$. In exemplary embodiments, the adjusted variables $s_1$ and $s_2$, a, $R_1$, $R_2$, and AP can be determined geometrically based on the measured variables ω, Δω, $x_1$, Δx, φ, $r_{ball}$, and RP. In some embodiments, a machine learning system may use a learning database of known marking adjustments to determine adjusted variables for an input marking. The adjusted variables can be used to create the adjusted design 24, which is used as the design for an etching pattern on a printing plate. For example, the adjusted variables may be used to determine a shape and position of an etching pattern on a printing plate. The printing plate thereby compensates for the curvature of a golf ball in a pad printing process to create a resultant marking with no apparent curvature.

Figure 3D:
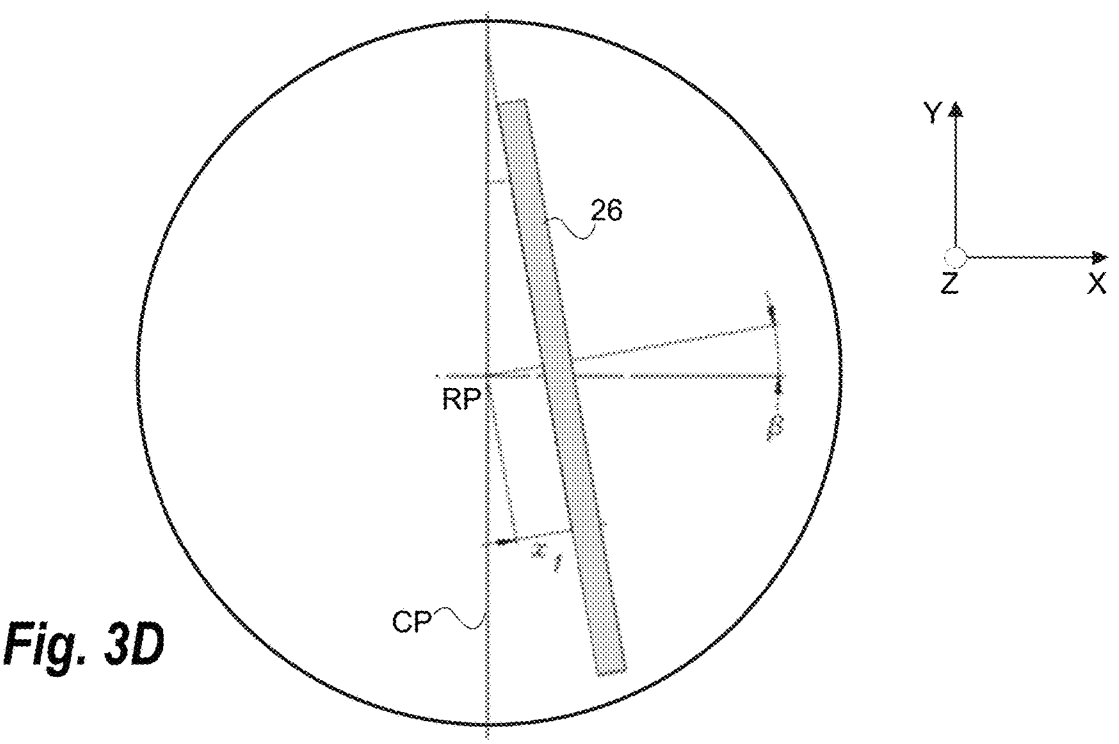
FIG. 3D is partial view of another intended design that includes an off-center marking that is not parallel to the depicted centerline plane and that has no apparent curvature.
Figure 3E:
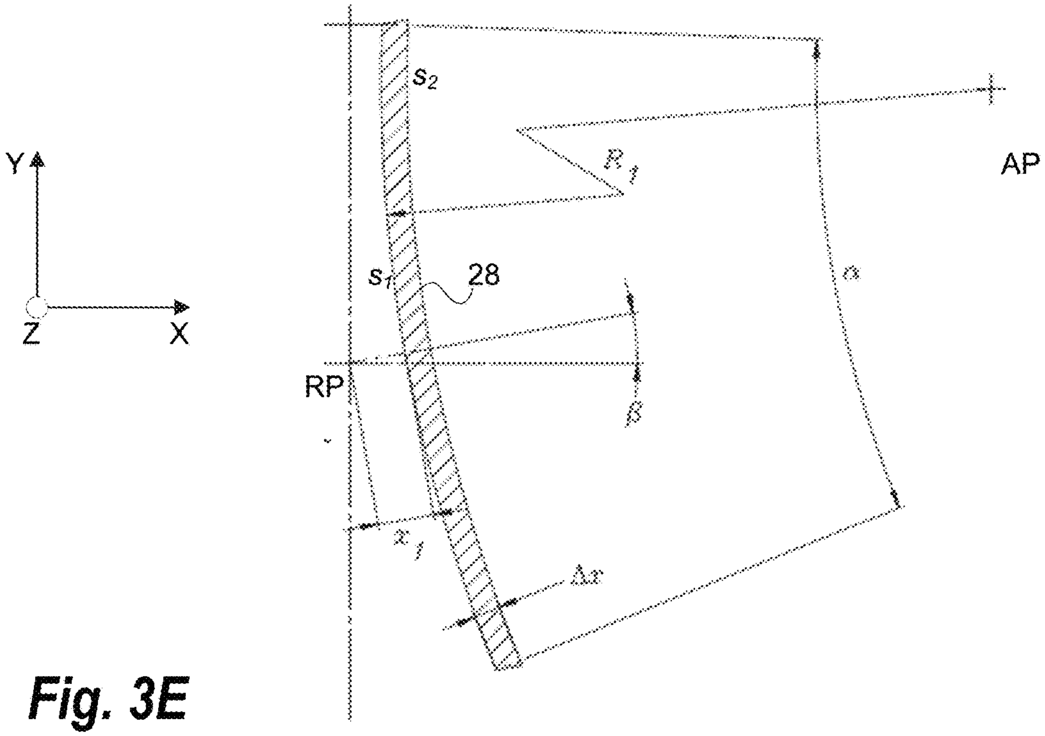
FIG. 3E is a depiction of an adjusted planar design that is generated based on the position and geometry of the intended design of FIG. 3D.

FIGS. 3D and 3E provide another example of an adjustment from a marking 26 to an adjusted design 28. The marking 26 has no apparent curvature and is not parallel to the depicted centerline plane CP and thus additional measured variables may be necessary to represent the position of the marking 26 on a golf ball. For example, the measured variables may also include a skew angle β that quantifies the deviation of the marking 22 from parallel relative to the centerline plane CP. The skew angle β can be used to determine the adjusted variables, such as $s_1$ and $s_2$, a, $R_1$, $R_2$, and AP, and thus the shape of the adjusted design 28.

The designs depicted in FIGS. 3A-3E have a constant line thickness. It should be understood, however, that the disclosed systems and methods may also be applicable to markings with inconsistent line thickness and other shapes, such as shapes associated with logos, side stamps, lettering, numbers, alignment markings, arrows, patterns, or any other stamp that may be printed on a golf ball. The disclosed concept of adjusting an intended design can be extended to a stamp made up of multiple lines. Each line may be individually modified to create the adjusted design, or the intended design marking may be represented as a generic shape or group of estimated lines and thereafter adjusted to compensate for the distortion due to printing on a spherical object.

Disclosed embodiments by use pad-printing ink for producing a marking. There are numerous types of pad-printing inks available within the printing industry, such as solvent evaporating inks, oxidation curing inks, reactive (catalyst curing or dual-component) inks, baking inks, UV curable inks, sublimation inks, and ceramic and glass inks.

Solvent-based inks are predominant in the pad-printing industry, as they dry very rapidly through solvent evaporation alone. They are very versatile inks, as they are available in both gloss and matte finishes and perform very well with many thermoplastic substrates. Oxidative curing inks have limited uses in pad-printing applications due to their slow drying speed. They do, however, produce very tough, flexible, weather-resistant ink films and are very useful for printing onto metal and glass surfaces.

It is possible to use 1-component inks because their long shelf life can make them easier to work with and more economical. Some 1-component inks are highly resistant to abrasion and solvents. Curing can take place physically or by oxidation.

Dual-component inks are also used extensively in pad-printing and contain resins capable of polymerization. These inks cure very rapidly, especially when heated and are generally good for printing on substrates such as metals, some plastics, and glass, and have very good chemical and abrasion resistance. The inks, though, do have a restricted shelf life once the polymerization catalyst has been added. With 2-component inks, curing typically takes place over about a 5-day period at a temperature of about 20° C., or over about a 10-minute period at a temperature of about 100° C.

Ceramic and gas (thermo) diffusion inks are also used in the pad-printing industry. These inks are solid at room temperature and must be heated in the ink reservoir to a temperature greater than about 80° C. Unlike solvent evaporating inks, pad wetting occurs due to the cooling effect the pad has on the heated ink rather than because of the evaporation of solvent. Ink transfer occurs because the outer surface of the ink becomes tacky when exposed to air. The ink transfer is aided by the cooler surface of the substrate to be printed on.

Ultraviolet ink can also be used in the present invention. UV inks are typically cured by means of UV light having wavelengths of from about 180 nm to 380 nm. The advantages of using a UV ink are that they are fast and cure thoroughly, they are easy to use and are not affected by small changes in ambient conditions, they retain constant viscosity (i.e., they do not dry up quickly), and they use smaller amounts of combustible organic solvent, such that little or no solvent fumes escape into the working environment and are, therefore, environmentally safer. Small amounts of solvent may be added to the UV inks for certain application to enable the ink to transfer in a conventional manner.

The inks may optionally contain additives such as binders, reactive prepolymers, thinners, low-viscosity mono and poly-functional monomers, photoinitiators to stimulate polymerization, stabilizing additives, flow control agents, wetting agents, pigments, extenders, or combinations thereof.

FIG. 3A includes marking 22 as a resulting marking after a pad-printing process using a pad-printing ink, which may be one of the inks described above as suitable for pad-printing. In the resulting marking, the reference position RP of the golf ball 20 lies in the centerline plane CP in the plan view of FIG. 3A and the marking 22 is a pad-printed linear marking spaced from the centerline plane CP. The marking 22 has linear edges defined by a constant thickness of the marking 22 (i.e., Δx). The centerline of the linear marking 22 lies entirely within the marking plane MP and the edges of the marking are parallel with the marking plane MP.

Figure 4A:
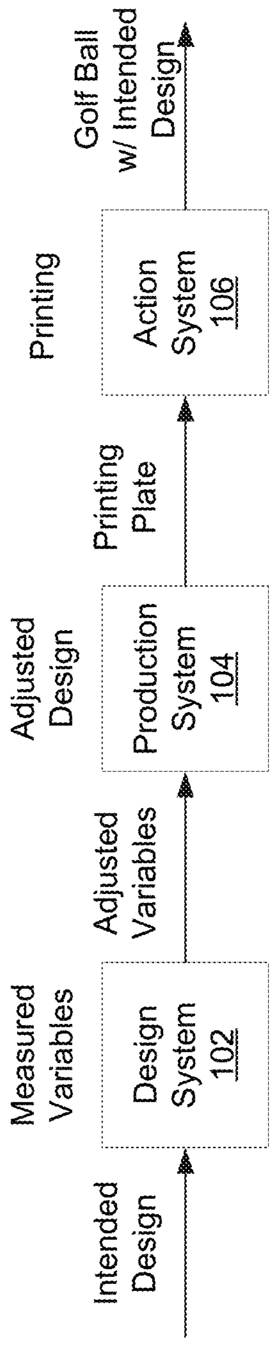
FIG. 4A is a process flow through an exemplary golf ball printing system, consistent with disclosed embodiments.

FIG. 4A is schematic diagram of a golf ball printing system 100 for producing a finished golf ball that includes a stamped marking. The golf ball printing system 100 includes a design system 102, a production system 104, and an action system 106. FIG. 4A further illustrates a method for producing the finished ball using the golf ball printing system 100. The process includes inputting an intended design into the design system 102. For example, an intended design may be created using design software on the design system 102. The intended design also indicates the desired position of the markings on a golf ball. The design system 102 may analyze the intended design and identify measured variables. The measured variables may be one or more parameters that identify the position of the markings on a golf ball. For example, the measured variables may include and offset angle ω, a line thickness Δx, a wrap angle φ, a skew angle β, and/or the radius of the ball $r_{ball}$. The design system 102 is further configured to generate adjusted variables based on the measured variables. As discussed herein, the adjusted variables account for the curvature of the golf ball when printing the marking design on a spherical object. Examples of the adjusted variables include arc lengths $s_1$ and $s_2$, arc angle α, and/or adjusted displacements $R_1$ and $R_2$.

In the process depicted in FIG. 4A, the adjusted variables are delivered to the production system 104. The production system 104 is configured to convert the adjusted variables into an adjusted design. The adjusted design may be a representation of the intended design that compensates for the curvature of a golf ball. More particularly, the adjusted design may be a design for an etching on a printing plate. The etching differs from the intended design and includes shapes that produce the intended design when printed on the golf ball. The production system 104 is configured to produce a printing plate having the etching. In some embodiments, the production system 104 includes an etching system for producing the printing plate. In other embodiments, the production system 104 delivers the adjusted design to a separate machine for etching the printing plate. The printing plate is delivered to the action system 106 for producing a finished golf ball. For example, the printing plate may be delivered to a pad printing system for printing a marking on the golf ball using the etched printing plate in a manner the same as or similar to the process depicted in FIG. 1. The resulting marking of a finished golf ball includes a marking that matches the intended design as a result of printing using an etching of an adjusted design that compensates for the curvature of the golf ball.

Figure 4B:
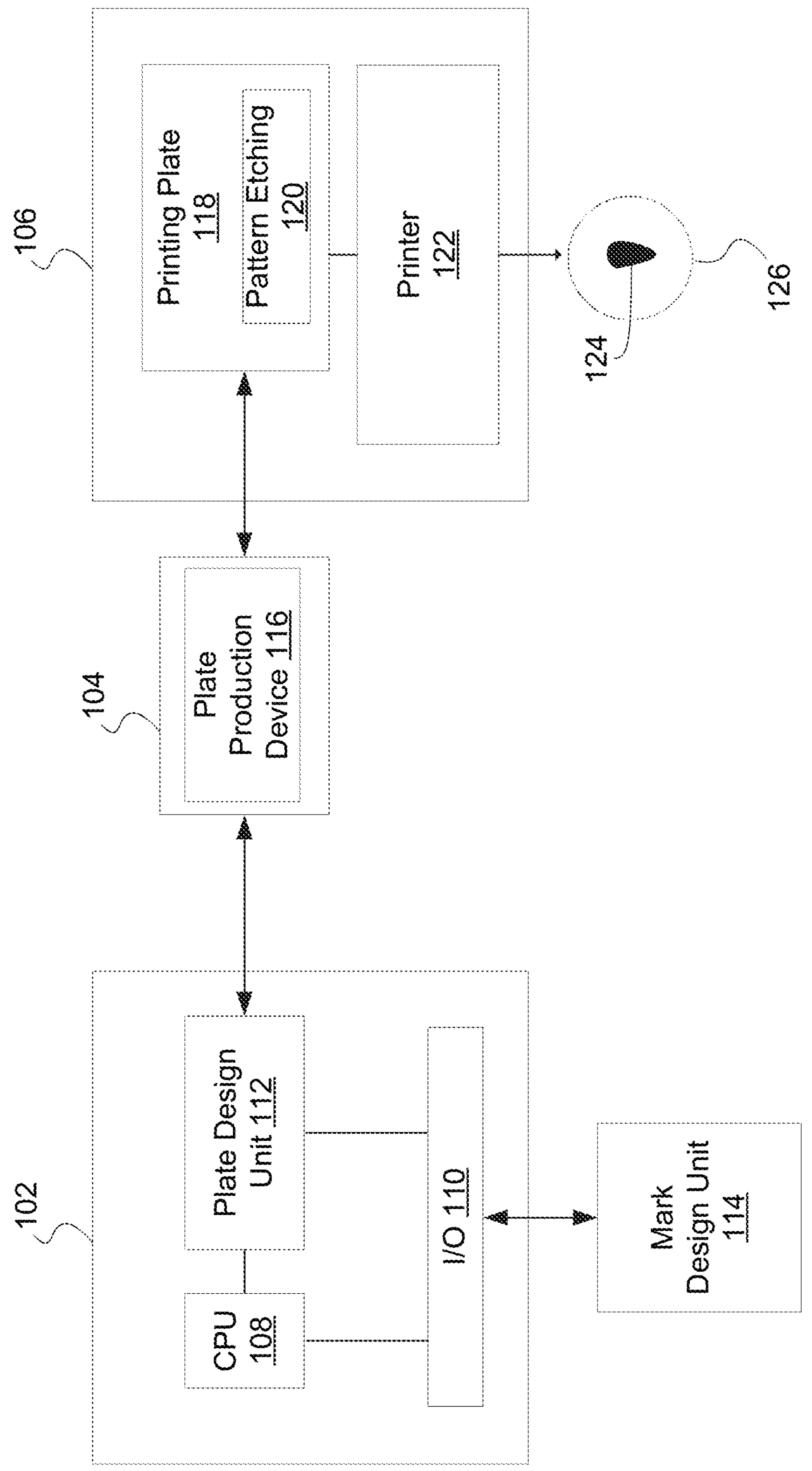
FIG. 4B is a diagram of the golf ball printing system, consistent with disclosed embodiments.

FIG. 4B is another diagram of the exemplary golf ball printing system 100. The golf ball printing system 100 includes the design system 102, the production system 104, and the action system 106. The design system 102 comprises and/or is configured to interface with a computing system configured to modify an intended design to create an adjusted design, as described herein. For example, the design system 102 may include a central processing unit (CPU) 108, an input/output (I/O) unit 110, and a plate design unit 112. In some embodiments, the design system 102 includes or interfaces with a mark design unit 114. The design system 102 is configured to receive an intended design and output an adjusted design. For example, the plate design unit 112 may be configured to receive an intended design, determine measured variables that depend on the position of the marking on the golf ball (e.g., relative to a centerline plane), and use the measured variables to determine adjusted variables for an adjusted design. The design system is configured to send the adjusted variables to the production system 104.

The production system 104 may include one or more computing systems and/or production devices 116 (e.g., a laser etch machine) configured to produce a printing plate 118 having an etching pattern 120. The etching pattern 120 corresponds to the adjusted design. For example, the production system 104 may produce the pattern etched printing plate 118 based on the adjusted variables received from the design system 102.

The action system 106 may include a printer 122 configured to print a marking 124 on a golf ball 126 by transferring ink from the printing plate 118 to the golf ball 126. For example, the printer 122 may be a pad printing system the same as or similar to FIG. 1 configured to transfer ink from the printing plate 118 to the golf ball 126 to produce the marking 124. The marking may correspond to the intended design input to the design system 102 when the golf ball 126 is viewed from a standard golfing position.

Figure 5:
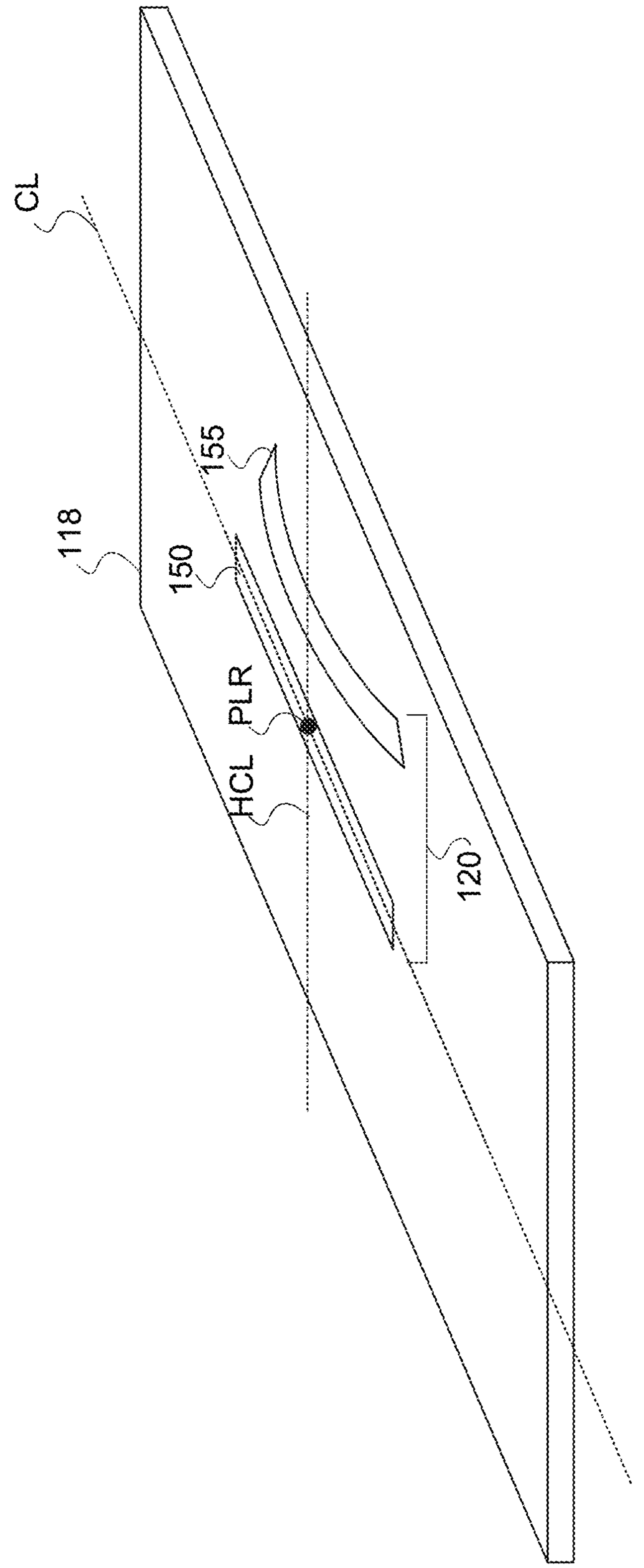
FIG. 5 is a perspective view of an exemplary printing plate, consistent with disclosed embodiments.

FIG. 5 is an exemplary depiction of the printing plate 118, including an etching pattern 120. The printing plate 118 may include a plate centerline CL. The plate centerline CL corresponds to the centerline plane CP of a golf ball. The printing plate 118 may also include a plate horizontal centerline HCL that is perpendicular to the plate centerline CL. The plate horizontal centerline HCL corresponds to the perpendicular centerline plane PCP. A plate reference point PLR is located at an intersection between the plate centerline CL and the horizontal centerline HCL. The plate reference point PLR may correspond to the reference position RP on the golf ball. The plate centerline CL, plate horizontal centerline HCL, and plate reference point PLR may thus be locations for matching a position on a golf ball to a position on the printing plate 118. The centerline CL and plate reference point PLR may serve as useful references since distortion of a marking is least (i.e., zero) along the centerline plane CP of the golf ball. In an exemplary embodiment, the production system 104 is configured to produce the printing plate 118 by etching an adjusted design using one or more of the plate centerline CL, the plate horizontal centerline HCL, or the plate reference point PLR as an orienting reference. While the term "centerline" is used for the plate centerline CL and the plate horizontal centerline HCL, it should be understood that such lines are not necessarily center or bisecting lines of the printing plate 118. In producing the printing plate 118, the production system 104 may be configured to map the reference point RP to the plate reference point PLR (and/or the arc position AP) and align the centerline plane CP and perpendicular centerline plane PCP to the plate centerline CL and plate horizontal centerline HCL, respectively.

In an exemplary embodiment, the etching pattern 120 may include an etch 150 positioned on the plate centerline CL and an etch 155 spaced from the plate centerline CL. The etch 150 is a linear etch on the plate centerline CL and therefore would produce a linear marking along the centerline plane CP of a golf ball. The plate reference point PLR may be matched to a reference on a golf ball to be printed such that the etch 150 produces the marking on the centerline plane CP of the finished golf ball. The etch 155 is spaced from the plate centerline CL and therefore would produce a marking spaced from the centerline plane CP of a golf ball. In an exemplary embodiment, the etch 155 corresponds to an adjusted design generated based on an intended design that includes a linear marking spaced and parallel to the marking produced by the etch 150. The adjusted design of the etch 155 is non-linear to compensate for the curvature of the golf ball.

Figure 6A:
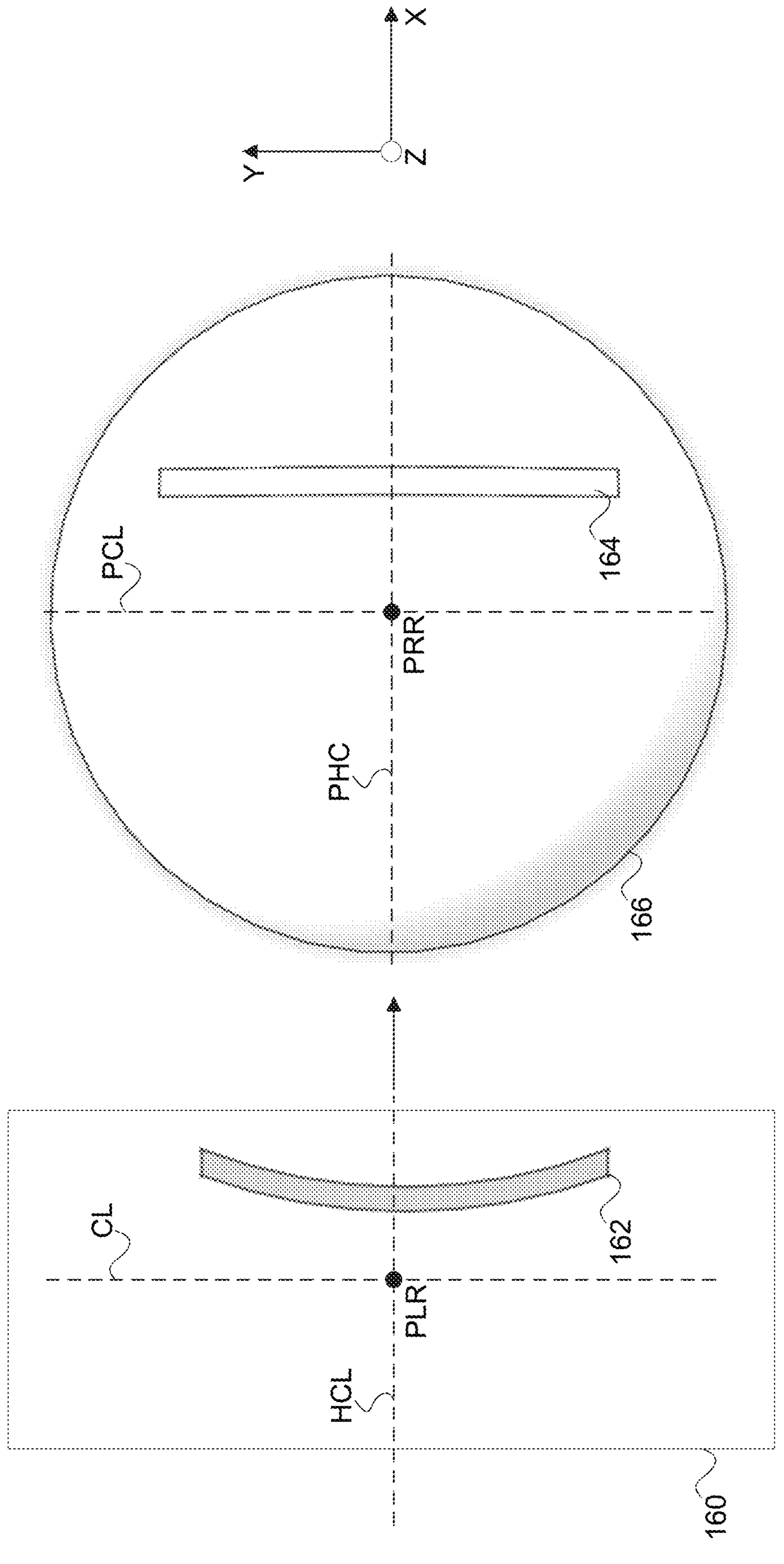
FIG. 6A is an example of a correspondence between a printing plate etching design of a marking and a resulting printed appearance of the marking on a golf ball.

FIG. 6A includes a depiction of a printing result from a printing plate 160 having an etching pattern 162. The printing plate 160 may be used to print a marking 164 on a golf ball 166. The etching pattern 162 is a curved etching corresponding to an adjusted design that may be produced based on an intended design corresponding to the marking 164. For example, the design system 102 may produce an adjusted design corresponding to the etching pattern 162 based on a position of the marking 164 on the golf ball 166. The curvature of the etching pattern 162 compensates for the curvature of the golf ball 166 to produce a linear marking 164 on the ball with no apparent curvature that is not coincident with a centerline plane and is parallel to a centerline plane CP of the golf ball 166.

Figure 6B:
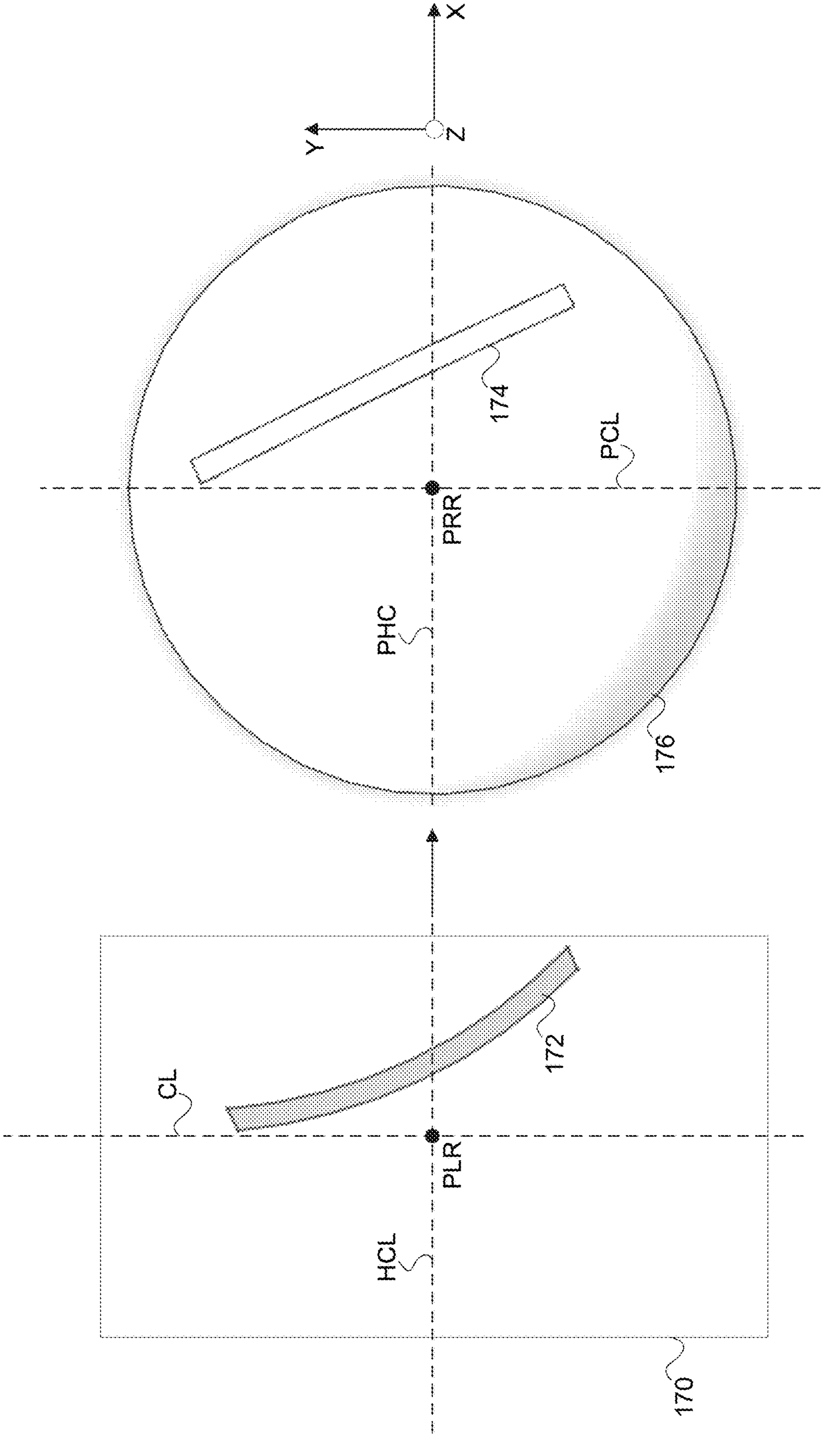
FIG. 6B is another example of a correspondence between a printing plate etching design of a marking and a resulting printed appearance of the marking on a golf ball.

FIG. 6B includes a printing result from a printing plate 170 having an etching pattern 172. The printing plate 170 may be used to print a marking 174 on a golf ball 176. The printing plate 170 and etching pattern 172 are similar to the printing plate 160 and etching pattern 162, except the etching pattern 172 is rotated according to a skew angle to produce a linear marking 174 that has no apparent curvature and is not parallel to the Y-axis centerline plane CP of the golf ball 176.

Both markings 164 and 174 may include a constant thickness and a centerline. The centerline may be used to determine parallelism with respect to a centerline plane CP. In the example of marking 164, the marking plane is parallel to the centerline plane CP whose normal is colinear with the x-axis. In the example of marking 174, the marking plane is parallel to the centerline plane CP whose normal is not colinear with either the x- or y-axis. In both instances, the markings 164, 174 include edges that are parallel to the corresponding marking planes.

In both printing steps depicted in FIGS. 6A and 6B, an alignment standard may be used to print at a desired location on the golf ball. For example, the golf ball 166 may include a printing reference point PRR corresponding to a center of the golf ball 166 from a standard golfing position (i.e., the top view shown in FIG. 6A). The printing reference point PRR may be an intersection of a printing centerline PCL and a printing horizontal centerline PHC of the golf balls 166, 176. The printing centerline PCL and printing horizontal centerline PHC may depend on other markings on the golf ball (e.g., logos, side stamps, numbering, etc.) such that the markings 164, 174 are positioned in a desired location relative to other indicia already on the golf balls 166, 176. In the printing process of producing the markings 164, 174, the plate reference point PRR may be mapped to the plate reference point PLR. In some embodiments, (e.g., when there are existing indicia on the golf balls 166, 176), the printing centerline PCL and printing horizontal centerline PHC may be aligned with the plate centerline CL and plate horizontal centerline HCL, respectively.

Figure 7:
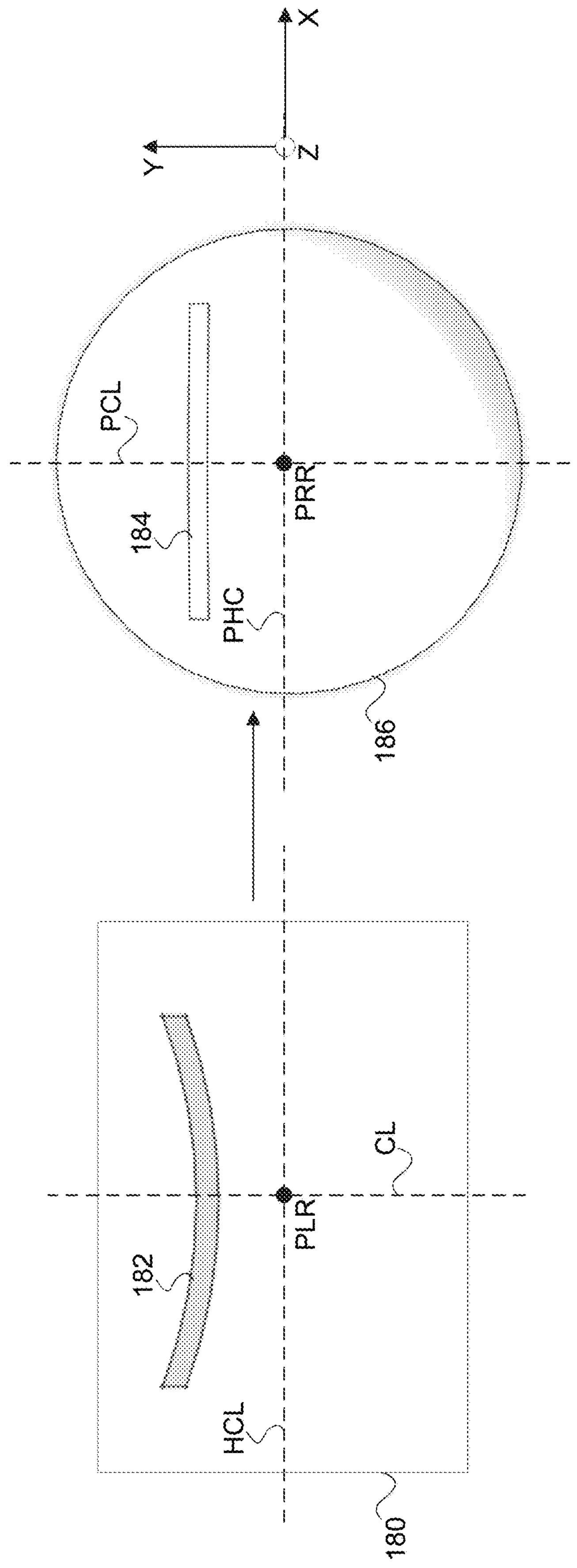
FIG. 7 is another example of a correspondence between a printing plate etching design of a marking and a resulting printed appearance of the marking a golf ball.
Figure 8A:
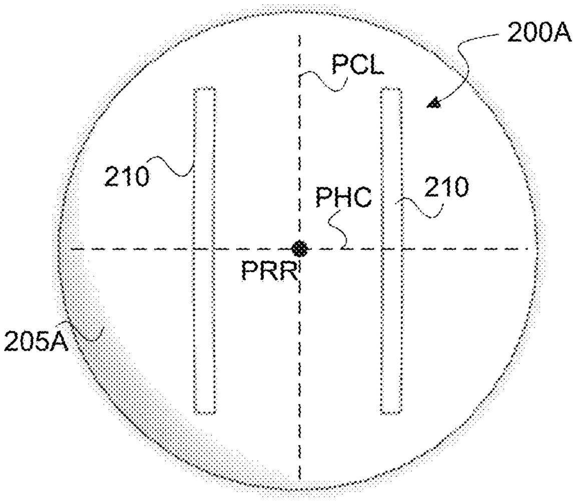
FIGS. 8A-8D include additional examples of golf balls having intended designs including linear components that are not coincident with a centerline plane, are parallel to a centerline plane, and have no apparent curvature, consistent with disclosed embodiments.
Figure 8B:
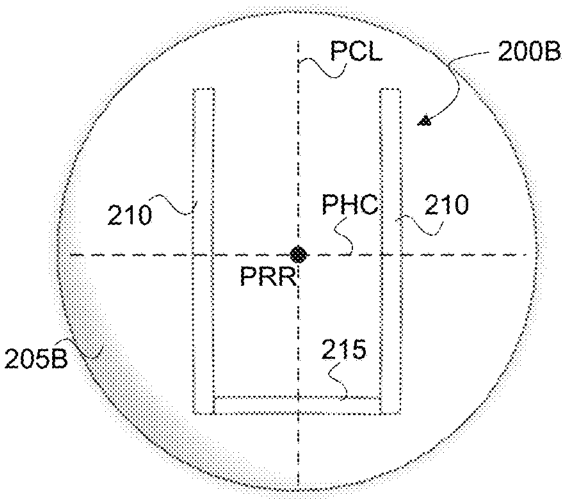
Figure 8C:
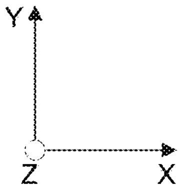
Figure 8C:
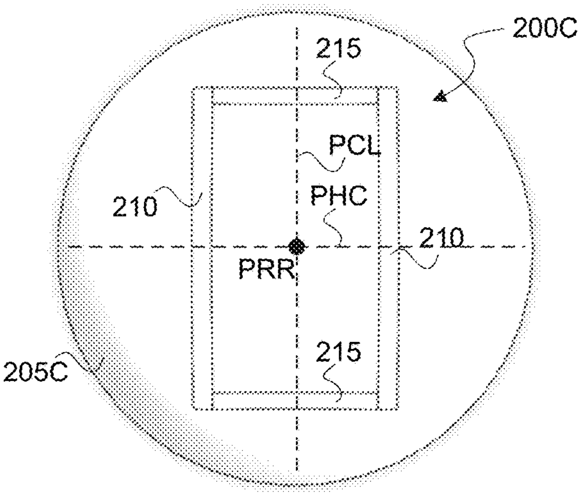
Figure 8D:
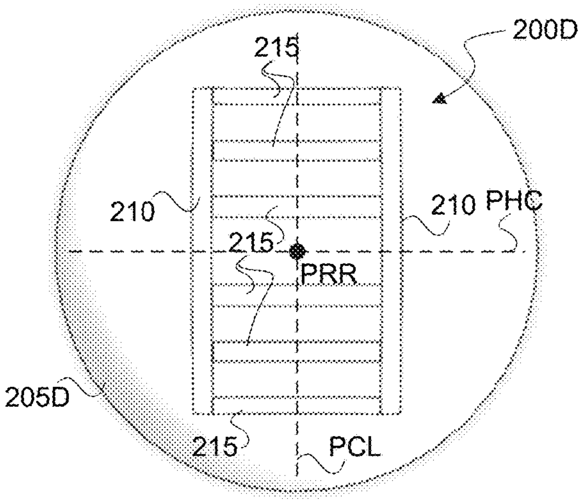
Figure 9A:
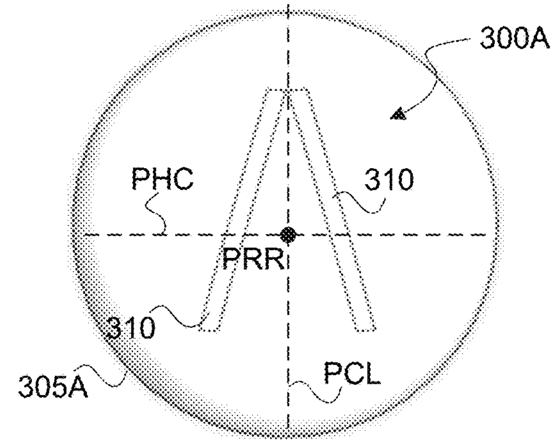
FIGS. 9A-9F include additional examples of golf balls having intended designs including linear components that are not coincident with a centerline plane, are not parallel to a Y-axis centerline plane, and have no apparent curvature, consistent with disclosed embodiments.
Figure 9D:
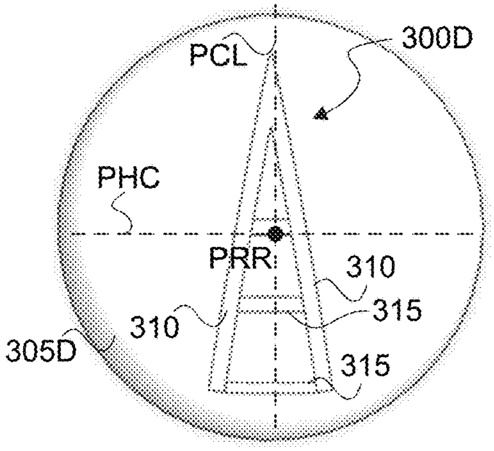
Figure 9B:
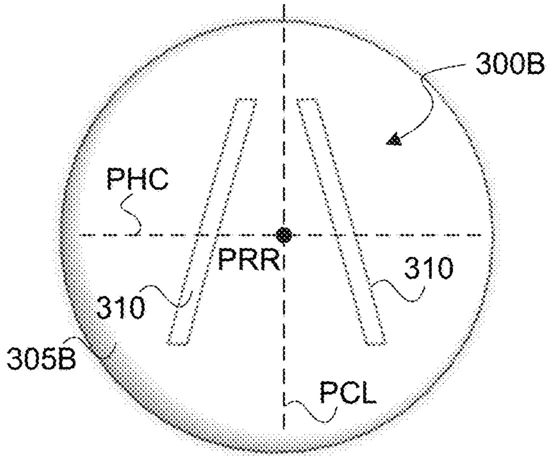
Figure 9E:
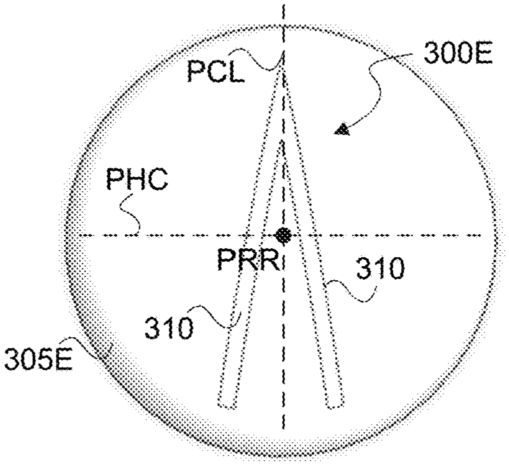
Figure 9C:
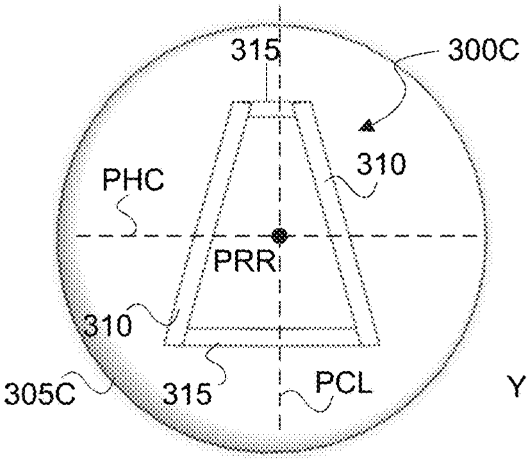
Figure 9F:
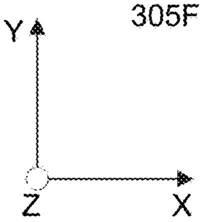
Figure 9F:
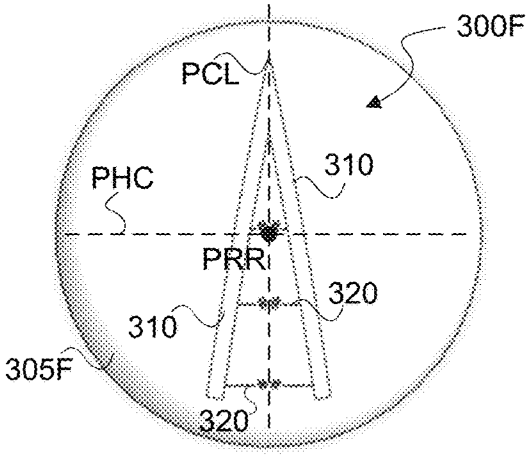

FIG. 7 is similar to FIGS. 6A and 6B and includes a depiction of printing results (i.e., a resulting marking) from a printing plate 180 having an etching patterns 182. The etching pattern 182 is an option for producing marking 184. Marking 184 is a linear marking that is spaced from the printing horizontal centerline PHC and the printing reference point PRR in the Y-direction on the golf ball 186. The etching pattern 182 is curved to compensate for the curvature of the golf ball 186. The etching pattern 182 may be similar to etching pattern 162 (except rotated about the Z-axis) and may be produced by adjusting an intended design that is linear and parallel to the x-axis. As described herein, the curvature of the etching pattern 182 may depend on the spacing of the intended design from the perpendicular centerline plane PCP. In this way, the etching pattern 182 may be used to print a linear marking 184 with no apparent curvature on the golf ball 186. The linear marking 184 lies in a marking plane that is not the centerline plane CP or the perpendicular centerline plane PCP (e.g., a centerline of the linear marking 184 lies entirely in the marking plane and the edges of the linear marking 184 are parallel to the marking plane).

The disclosed embodiments are applicable to printing markings, especially printing markings on golf balls using pad printing. Disclosed printing methods may include creating an intended design that includes a position of a marking relative to one or more of a centerline plane CP, a perpendicular centerline plane PCP, or a reference position RP (see FIGS. 3A, 3B, and 3D, for example). The methods may further include modifying the intended design to produce an adjusted design that accounts for the curvature of the golf ball during printing (see FIGS. 3C and 3E, for example). The adjusted design may be used to produce an etching pattern on a printing plate. The etching may be mapped to the intended design using a plate reference point PLR, a plate centerline CL, and a plate horizontal centerline HCL (see FIG. 5, for example). The printing plate having the etching pattern may be used to print on a golf ball using pad printing. In the printing process, a golf ball may be positioned such that one or more of a printing reference point PRR, a printing centerline PCL, or a printing horizontal centerline PHC are aligned with the plate reference point PLR, the plate centerline CL, or the plate horizontal centerline HCL (see FIGS. 6A, 6B, and 7, for example). The disclosed printing process thus produces a resulting marking that matches an intended design when viewed from a standard golfing position by compensating for the curvature of the golf ball during the printing process for markings that are not coincident with a centerline plane CP of the golf ball.

FIGS. 8A-8D include depictions of examples of resulting markings 200A-D printed on golf balls 205A-D using disclosed printing methods. Each of the resulting markings 200A-D include one or more linear markings 210 that are spaced and parallel to a centerline plane CP of the golf balls 205A-D in an X-direction. The linear markings 210 are coincident with a perimeter of a base of a spherical cap having a volume that is less than half of the golf ball. The linear markings 210 may be printed using a printing plate having an etching that is produced based on an adjustment to an intended design, as described herein. The linear markings 210 may be parallel to a Y-direction and thus parallel to a target line for a golfer. The linear appearance of the markings 210 with no apparent curvature may help the golfer be more precise in their alignment toward a target.

In some of the resulting markings 200A-D, horizontal markings 215 may also be included. In some embodiments, the horizontal linear markings 215 may be printed using a printing plate having an etching that is produced based on an adjustment to an intended design, as described herein (see FIG. 7, for example).

FIGS. 9A-9F include depictions of examples of resulting markings 300A-F printed on golf balls 305A-F using disclosed printing methods. Each of the resulting markings 300A-F include one or more linear markings 310 that are not coincident with and not parallel to each other or the Y-axis centerline plane CP of the golf balls 305A-F. The linear markings 310 are tilted by a skew angle relative to a Y-direction/centerline plane CP. Multiple linear markings 310 may be connected or distinct from each other. In some embodiments, horizontal linear markings 315 or other markings 320 may be included to produce more complex designs. The other markings 320 may be, for example, textual indicia. It should be understood that textual indicia or other similar markings may be used in place of the rectangular lines shown in the depicted designs. Further, as described herein, more complex designs (e.g., images, logos, block text, etc.) may be printed using disclosed methods, such as by representing such designs as multiple lines with varying spacing from reference positions. Additionally, it should be understood that the goal marking and thus the adjusted etching plate design may be comprised of one or more distinct marking. A goal marking composed of more than one distinct marking may be printed using a series of etching plates or may also be printed using one etching plate containing multiple adjusted markings.

The disclosed embodiments provide printing methods and golf balls produced by such methods. The disclosed golf balls include markings with an improved appearance by compensating for the curvature of the golf ball during printing. In particular, the design for the etching pattern on a printing plate is adjusted to compensate for a visual distortion that may otherwise occur depending on the position of a marking on the golf ball. The further from the centerline plane of the golf ball, the larger the necessary adjustment of the etching pattern. As a result, a printed appearance of a golf ball in a standard golfing position is visually appealing, more precisely aligns with a target line of the golfer, and eliminates apparent curvature of markings intended to be linear when viewed from the standard golfing position.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention

The invention claimed is:

1. A method for printing a stamp on a golf ball, the stamp comprising a plurality of linear markings, the method comprising:

arranging ink in an etching pattern on a printing plate, wherein the pattern includes an etch corresponding to the stamp, wherein the etch differs from the stamp in a manner dependent on the position of the stamp on the golf ball, and wherein the etch comprises, for each linear marking of the plurality of linear markings, a depression defined by edges that follow the path of an arc along a non-zero arc angle;

matching a reference position on the plate to a reference position on the golf ball;

transferring the ink from the printing plate to a pad;

transferring the ink from the pad to the golf ball such that the golf ball includes the stamp, and wherein, in a plan view as viewed in a direction toward the reference position of the golf ball, a centerline of each of the plurality of linear markings lies entirely within a respective marking plane that is not a centerline plane of the golf ball, and wherein side edges of each of the plurality of linear markings marking are parallel with the respective marking plane.

2. The method of claim 1, wherein the plurality of linear markings comprises a first linear marking that, in a plan view as viewed in a direction toward the reference position of the golf ball, is coincident with a perimeter of a base of a spherical cap having a volume that is less than half of that of the golf ball.

3. The method of claim 2, wherein the plurality of linear markings comprises a first linear marking that includes a non-zero skew angle β that is a deviation of the marking from parallel relative to the centerline plane and a second linear marking that includes a different non-zero skew angle relative to the centerline plane.

4. The method of claim 3, wherein the first linear marking and the second linear marking do not intersect.

5. The method of claim 3, wherein the first linear marking and the second linear marking intersect.

6. The method of claim 3, wherein the plurality of linear markings comprises a third linear marking that connects the first linear marking to the second linear marking.

7. The method of claim 2, wherein the plurality of linear markings comprises a second linear marking that is parallel to the first linear marking in a plan view as viewed in a direction toward the reference position of the golf ball.

8. The method of claim 2, wherein the plurality of linear markings comprises a second linear marking that is perpendicular to the first linear marking.

9. The method of claim 2, wherein the plurality of linear markings comprises a second linear marking that is parallel to the first linear marking and a third linear marking that is perpendicular to the first linear marking.

10. The method of claim 9, wherein the plurality of linear markings comprises a fourth linear marking that is perpendicular to the first linear marking and parallel to the third linear marking.

* * * * *